(12) United States Patent
Rechis et al.

(10) Patent No.: US 8,996,507 B2
(45) Date of Patent: Mar. 31, 2015

(54) LOCATION IN SEARCH QUERIES

(75) Inventors: Leland Rechis, Brooklyn, NY (US); Scott Jenson, Palo Alto, CA (US); Yael Shacham, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/214,737

(22) Filed: Aug. 22, 2011

(65) Prior Publication Data

US 2011/0320488 A1    Dec. 29, 2011

Related U.S. Application Data

(63) Continuation of application No. 11/624,184, filed on Jan. 17, 2007, now Pat. No. 8,005,822.

(51) Int. Cl.
*G06F 17/30* (2006.01)

(52) U.S. Cl.
CPC ...... *G06F 17/3087* (2013.01); *Y10S 707/99935* (2013.01); *Y10S 707/99933* (2013.01); *Y10S 707/99934* (2013.01)
USPC .... 707/721; 707/709; 707/768; 707/999.005; 707/999.003; 707/999.004

(58) Field of Classification Search
USPC ............ 707/999.002–999.003, 709, 721, 768
See application file for complete search history.

(56) References Cited

U.S. PATENT DOCUMENTS

| | | |
|---|---|---|
| 5,263,157 A | 11/1993 | Janis |
| 5,826,261 A | 10/1998 | Spencer |
| 5,949,413 A | 9/1999 | Lerissa et al. |
| 5,983,220 A | 11/1999 | Schmitt |
| 5,983,221 A | 11/1999 | Christy |
| 6,023,708 A | 2/2000 | Mendez et al. |
| 6,324,544 B1 | 11/2001 | Alam et al. |
| 6,356,905 B1 | 3/2002 | Gershman et al. |
| 6,370,527 B1 | 4/2002 | Singhal |
| 6,393,423 B1 | 5/2002 | Goedken |
| 6,484,162 B1 * | 11/2002 | Edlund et al. .......................... 1/1 |
| 6,610,105 B1 | 8/2003 | Martin, Jr. et al. |
| 6,636,853 B1 | 10/2003 | Stephens, Jr. |
| 6,715,131 B2 | 3/2004 | Martin, Jr. et al. |

(Continued)

FOREIGN PATENT DOCUMENTS

| | | |
|---|---|---|
| EP | 0 918 295 | 5/1999 |
| EP | 1 288 626 | 3/2003 |

(Continued)

OTHER PUBLICATIONS

European Search Report issued in EP 08713814.5 on Nov. 4, 2010.

(Continued)

*Primary Examiner* — Monica Pyo
(74) *Attorney, Agent, or Firm* — Fish & Richardson P.C.

(57) ABSTRACT

A computer-implemented method includes receiving a search query from a remote device, determining if the search query includes location-related information, and if the search query includes location-related information, generating a first result set based on the search query and the location-related information, and if the search query does not include location-related information, determining whether a location indicator is associated with the remote device, and if a location indicator is associated with the remote device, generating a second result set based on the search query and the location indicator.

20 Claims, 7 Drawing Sheets

(56) References Cited

U.S. PATENT DOCUMENTS

| | | |
|---|---|---|
| 6,738,766 B2 | 5/2004 | Peng |
| 6,769,130 B1 | 7/2004 | Getsin et al. |
| 6,816,944 B2 | 11/2004 | Peng |
| 6,941,383 B1 | 9/2005 | Getsin et al. |
| 6,944,621 B1 | 9/2005 | Collart |
| 6,944,661 B2 | 9/2005 | Moore et al. |
| 6,961,731 B2 | 11/2005 | Holbrook |
| 6,996,798 B2 | 2/2006 | Ali et al. |
| 7,043,521 B2 | 5/2006 | Eitel |
| 7,043,685 B2 | 5/2006 | Azuma |
| 7,047,499 B2 | 5/2006 | Ferri |
| 7,054,870 B2 | 5/2006 | Holbrook |
| 7,117,239 B1 | 10/2006 | Hansen |
| 7,149,792 B1 | 12/2006 | Hansen et al. |
| 7,162,473 B2 | 1/2007 | Dumais et al. |
| 7,162,494 B2 | 1/2007 | Arellano |
| 7,165,105 B2 | 1/2007 | Reiner et al. |
| 7,178,106 B2 | 2/2007 | Lamkin et al. |
| 7,178,149 B2 | 2/2007 | Hansen |
| 7,181,488 B2 | 2/2007 | Martin et al. |
| 7,185,014 B1 | 2/2007 | Hansen |
| 7,188,193 B1 | 3/2007 | Getsin et al. |
| 7,219,139 B2 | 5/2007 | Martin et al. |
| 7,228,493 B2 | 6/2007 | Kosak et al. |
| 7,251,687 B1 | 7/2007 | McCullough |
| 7,269,634 B2 | 9/2007 | Getsin et al. |
| 7,281,042 B2 | 10/2007 | Hsu |
| 7,287,251 B1 | 10/2007 | Mensching et al. |
| 7,290,223 B2 | 10/2007 | Decombe |
| 7,318,056 B2 | 1/2008 | Taniguchi et al. |
| 7,346,843 B2 | 3/2008 | Hind et al. |
| 7,346,920 B2 | 3/2008 | Lamkin et al. |
| 7,373,244 B2 | 5/2008 | Kreft |
| 7,376,640 B1 * | 5/2008 | Anderson et al. ........................ 1/1 |
| 7,379,661 B2 | 5/2008 | Lamkin et al. |
| 7,392,481 B2 | 6/2008 | Gewickey et al. |
| 7,444,319 B1 | 10/2008 | Sathyanarayan |
| 7,448,021 B1 | 11/2008 | Lamkin et al. |
| 7,454,515 B2 | 11/2008 | Lamkin et al. |
| 7,458,091 B1 | 11/2008 | Getsin et al. |
| 7,487,499 B2 | 2/2009 | Gatz |
| 7,493,315 B2 | 2/2009 | Holbrook |
| 7,499,938 B2 | 3/2009 | Collart |
| 7,505,992 B2 | 3/2009 | Collart |
| 7,536,408 B2 | 5/2009 | Patterson |
| 7,555,476 B2 | 6/2009 | Holbrook |
| 7,567,959 B2 | 7/2009 | Patterson |
| 7,577,677 B2 | 8/2009 | Collart |
| 7,580,921 B2 | 8/2009 | Patterson |
| 7,580,929 B2 | 8/2009 | Patterson |
| 7,584,175 B2 | 9/2009 | Patterson |
| 7,584,223 B1 | 9/2009 | Pinkas |
| 7,587,486 B2 | 9/2009 | Taniguchi |
| 7,599,914 B2 | 10/2009 | Patterson |
| 7,603,345 B2 | 10/2009 | Patterson |
| 7,617,164 B2 | 11/2009 | Burges et al. |
| 7,624,103 B2 | 11/2009 | Wiegering et al. |
| 7,630,972 B2 * | 12/2009 | Ott et al. ................................ 1/1 |
| 7,650,342 B2 | 1/2010 | Sugiyama et al. |
| 7,676,505 B2 | 3/2010 | Chess et al. |
| 7,689,510 B2 | 3/2010 | Lamkin et al. |
| 7,689,615 B2 | 3/2010 | Burges et al. |
| 7,693,863 B2 | 4/2010 | Martin et al. |
| 7,702,618 B1 | 4/2010 | Patterson |
| 7,711,679 B2 | 5/2010 | Patterson |
| 7,711,795 B2 | 5/2010 | Getsin et al. |
| 7,716,158 B2 | 5/2010 | McConnell |
| 7,743,046 B2 | 6/2010 | Anand et al. |
| 7,756,890 B2 | 7/2010 | Carter |
| 7,765,206 B2 | 7/2010 | Hillis et al. |
| 7,966,309 B2 | 6/2011 | Shacham et al. |
| 7,966,321 B2 | 6/2011 | Wolosin et al. |
| 8,005,822 B2 | 8/2011 | Rechis et al. |
| 8,046,375 B2 | 10/2011 | Quince |
| 8,086,604 B2 | 12/2011 | Arrouye et al. |
| 8,489,591 B2 | 7/2013 | Wolosin et al. |
| 2002/0103787 A1 | 8/2002 | Goel et al. |
| 2004/0162830 A1 | 8/2004 | Shirwadkar et al. |
| 2005/0065774 A1 | 3/2005 | Doganata et al. |
| 2005/0071328 A1 | 3/2005 | Lawrence et al. |
| 2005/0125447 A1 | 6/2005 | Cragun et al. |
| 2005/0240576 A1 * | 10/2005 | Piscitello et al. ................ 707/3 |
| 2005/0240580 A1 | 10/2005 | Zamir et al. |
| 2006/0069664 A1 | 3/2006 | Ling et al. |
| 2006/0129907 A1 * | 6/2006 | Volk et al. ..................... 715/500 |
| 2006/0149734 A1 | 7/2006 | Egnor et al. |
| 2006/0161535 A1 | 7/2006 | Holbrook |
| 2006/0184512 A1 | 8/2006 | Kohanim et al. |
| 2006/0248061 A1 | 11/2006 | Kulakow et al. |
| 2006/0271520 A1 | 11/2006 | Ragan |
| 2007/0042800 A1 | 2/2007 | Tani |
| 2007/0061301 A1 | 3/2007 | Ramer et al. |
| 2007/0118533 A1 | 5/2007 | Ramer et al. |
| 2007/0130091 A1 | 6/2007 | Cordery et al. |
| 2008/0071738 A1 | 3/2008 | Hoeber et al. |
| 2008/0172357 A1 | 7/2008 | Rechis et al. |
| 2008/0172362 A1 | 7/2008 | Shacham et al. |
| 2008/0172374 A1 | 7/2008 | Wolosin et al. |
| 2008/0215557 A1 | 9/2008 | Ramer et al. |
| 2010/0287049 A1 | 11/2010 | Rousso et al. |
| 2011/0252016 A1 | 10/2011 | Shacham et al. |
| 2011/0264654 A1 | 10/2011 | Wolosin et al. |

FOREIGN PATENT DOCUMENTS

| | | |
|---|---|---|
| EP | 1 420 550 | 5/2004 |
| EP | 1420550 | 5/2004 |
| EP | 1 555 625 | 7/2005 |
| JP | H10-257100 | 9/1998 |
| JP | 2002-269129 | 9/2002 |
| JP | 2003-099456 | 4/2003 |
| JP | 2003-242169 | 8/2003 |
| JP | 2004-348511 | 12/2004 |
| JP | 2004-355075 | 12/2004 |
| KR | 1020030066064 | 8/2003 |
| KR | 1020060104031 | 10/2006 |
| WO | WO 00/41090 | 7/2000 |
| WO | WO 02/41190 | 5/2002 |
| WO | 03/079229 | 9/2003 |
| WO | WO 2004/099916 | 11/2004 |
| WO | WO 2005/066831 | 7/2005 |
| WO | WO 2005/066844 | 7/2005 |
| WO | 2006/061270 | 6/2006 |
| WO | WO 2007/005945 | 1/2007 |

OTHER PUBLICATIONS

International Preliminary Report on Patentability for Application No. PCT/US2008/051339, dated Jul. 30, 2009, 8 pages.
International Preliminary Report on Patentability for Application No. PCT/US2008/051361, dated Jul. 30, 2009, 7 pages.
International Preliminary Report on Patentability for Application No. PCT/US2008/051354, dated Jul. 30, 2009, 9 pages.
Hattori et al., "Activity-Based Query Refinement for Context-Aware Information Retrieval" ICADL 2006, LNCS 4312: 474-477 (2006).
Hattori et al., "Context-Aware Query Refinement for Mobile Web Search," SAINTW'07, pp. 1-4.
International Search Report & Written Opinion, PCT/US2008/051339, mailed May 26, 2008, 12 pages.
International Search Report & Written Opinion, PCT/US2008/051354, mailed Jul. 2, 2008, 15 page.
International Search Report & Written Opinion, PCT/US2008/051361, mailed May 26, 2008, 11 pages.
Lee Wang, et al. "Detecting Dominant locations from search queries," SIGIR '05: Proceedings of the 28th Annual Int'l ACM SIGIR Conference on Research and Development in Information Retrieval, [Online] Aug. 19, 2005, pp. 424-431 Salvador, Brazil. Aug. 15 19, 2005, Retrieved from the Internet: URL:http://doi.acm.org/10.1145/1076034.1076107> [retrieved on Jun. 17, 2008].
Machine Translation of Korean Patent Documents KR 10-2006-0104031 (10 pages).

(56) References Cited

OTHER PUBLICATIONS

Japanese Official Action for Application No. JP 2009-546516, dated Jul. 31, 2012, 6 pages.
European Office Action in European Application No. 08713811.1 dated Jan. 18, 2012, 8 pages.
European Search Report issued in EP 08713814.5 on Nov. 24, 2010, 3 pages.
Communication Pursuant to Art. 94(3) for EP Application No. 08 71 3800, dated Jun. 12, 2012, 5 pages.
European Search Report for EP Application No. 08 71 3800, dated May 23, 2012, 3 pages.
Japanese Official Action for Application No. 2009-546514, dated Oct. 23, 2012, 7 pages.
Japanese Office Action in Japanese Application No. 2009-546516, mailed Jun. 11, 2013, 3 pages.
Jones et al., *Sorting out Searching on Small Screen Devices*, 2002, 15 pages.
USPTO Final Office Action in U.S. Appl. No. 11/624,175, dated Apr. 8, 2009, 24 pages.
USPTO Final Office Action in U.S. Appl. No. 11/624,175, dated Jun. 11, 2010, 36 pages.
USPTO Final Office Action in U.S. Appl. No. 11/624,184, dated Jun. 1, 2010, 15 pages.
USPTO Final Office Action in U.S. Appl. No. 11/624,191, dated Apr. 9, 2009, 20 pages.
USPTO Final Office Action in U.S. Appl. No. 11/624,191, dated May 3, 2010, 37 pages.
USPTO Non-final Office Action in U.S. Appl. No. 11/624,175, dated Oct. 31, 2008, 21 pages.
USPTO Non-final Office Action in U.S. Appl. No. 11/624,175, dated Dec. 4, 2009, 38 pages.
USPTO Non-final Office Action in U.S. Appl. No. 11/624,184, dated Jan. 22, 2009, 22 pages.
USPTO Non-final Office Action in U.S. Appl. No. 11/624,184, dated Nov. 25, 2009, 15 pages.
USPTO Non-final Office Action in U.S. Appl. No. 11/624,191, dated Oct. 31, 2008, 20 pages.
USPTO Non-final Office Action in U.S. Appl. No. 11/624,191, dated Oct. 23, 2009, 29 pages.
USPTO Non-final Office Action in U.S. Appl. No. 13/164,550, dated Apr. 25, 2013, 15 pages.
Kajmo and Florio, "Domino R5: Domain Search," IBM [online] Mar. 1, 1999, [retrieved on Jan. 6, 2014] Retrieved from the Internet <URL: http://www.ibm.com/developerworks/lotus/library/ls-Domain_Search/>, 12 pages.
O'Brien, "The New Domino R5 Directory Catalog: An Administrator's Guide," The View, 4(6):3-20, 18 pages Nov./Dec. 1998.
Office Action in Australian Application No. 2008206127, dated Oct. 17, 2011, 2 pages.
Office Action in Canadian Application No. 2,675,858, dated Aug. 27, 2013, 3 pages.
Office Action in Chinese Application No. 200880008570.8, dated Feb. 29, 2012, 3 pages [English translation only].
USPTO Final Office Action in U.S. Appl. No. 13/164,550, dated Oct. 11, 2013, 12 pages.
Australian Office Action in Australian Application No. 2012216475, mailed Feb. 21, 2014, 3 pages.

\* cited by examiner

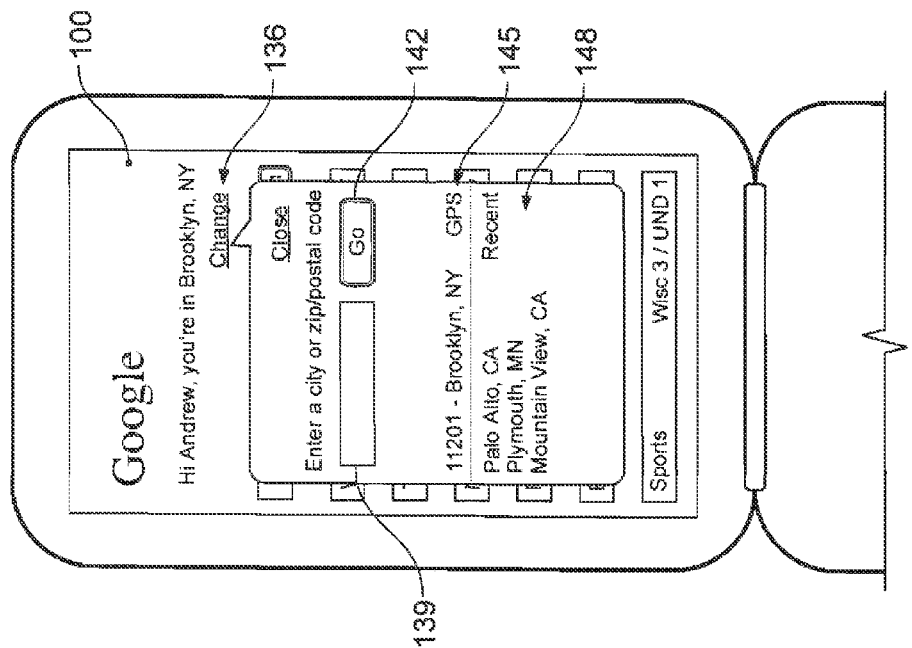
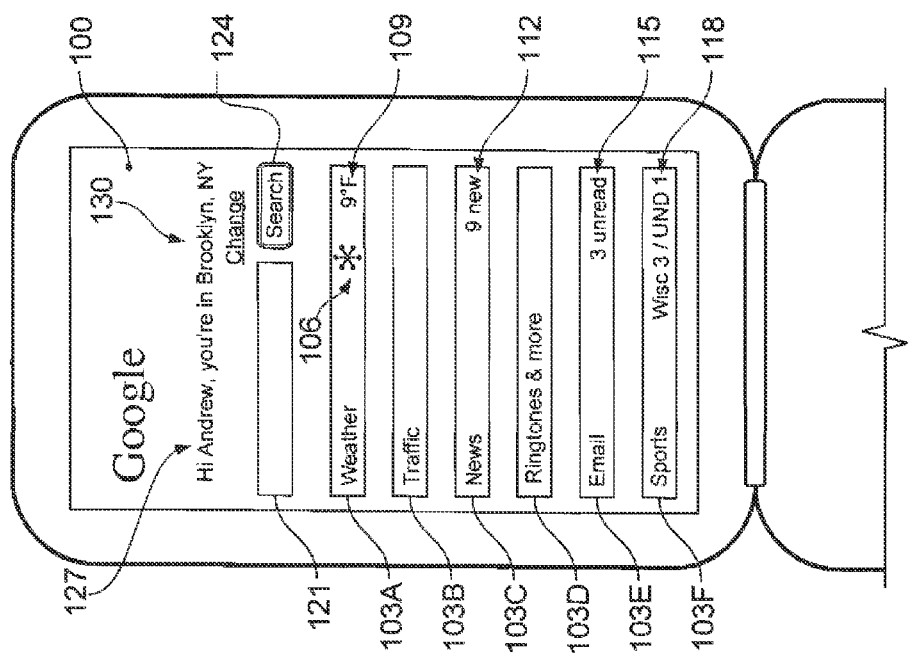
FIG. 1B
FIG. 1A

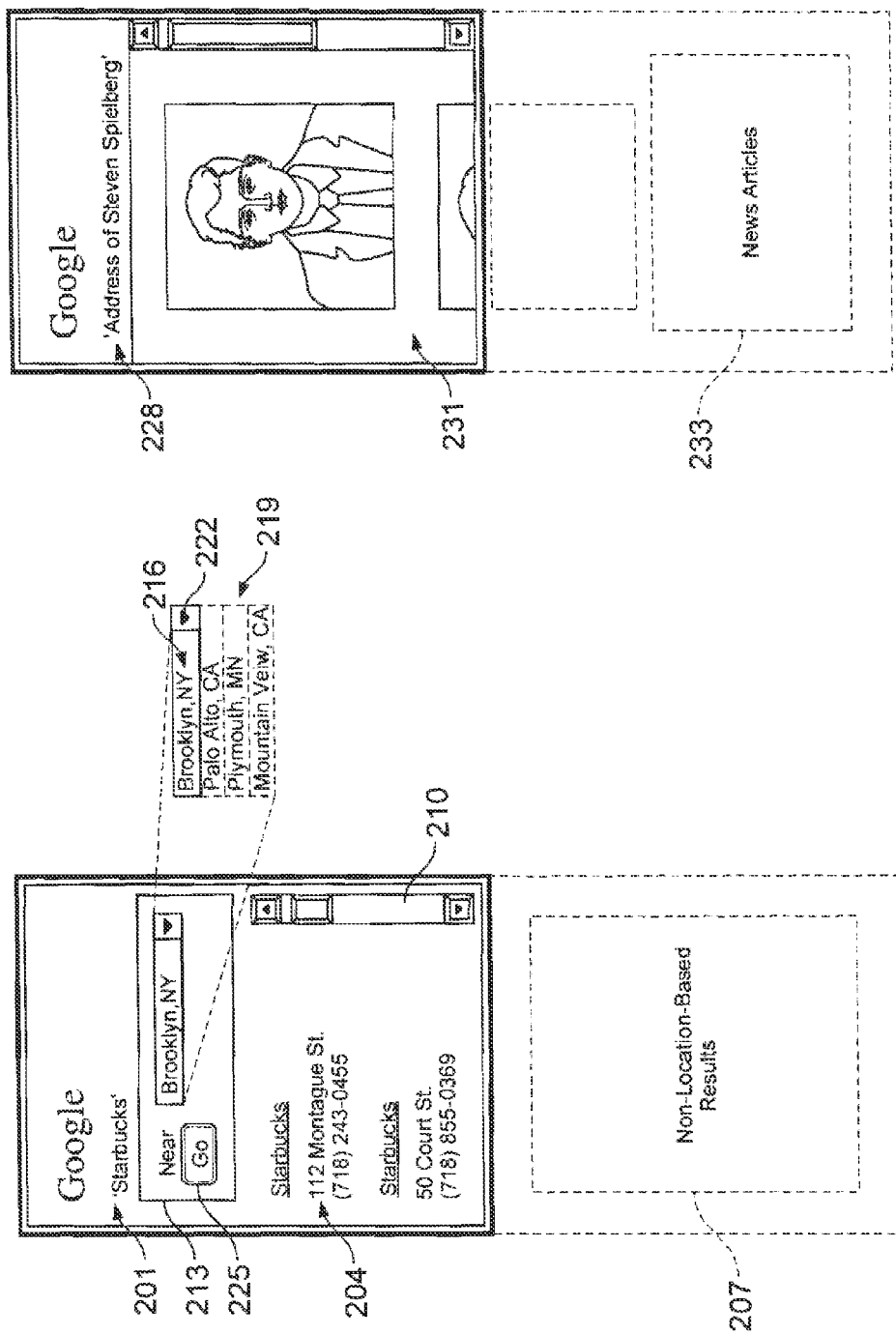

LOCATION IN SEARCH QUERIES

CROSS-REFERENCE TO RELATED APPLICATION

This application is a continuation application and claims the priority of U.S. application Ser. No. 11/624,184, filed Jan. 17, 2007 and entitled "LOCATION IN SEARCH QUERIES," the contents of which are incorporated herein by reference.

TECHNICAL FIELD

Various implementations in this document relate generally to the presentation of search results when a search query is determined to be associated with a location.

BACKGROUND

Vast amounts of information are available on the Internet, the World Wide Web, and on smaller networks. Users of desktop, laptop, and notebook computers on these networks have long enjoyed rich content, like images, audio, video, animation, and other multimedia content. As the number of features available in mobile devices (e.g., cell phones, smartphones, personal digital assistants (PDAs), personal information managers, etc.) has increased, user expectations of those devices have also increased. Users now expect that much of this rich content will also be available from their mobile devices. They expect to have access on the road, in coffee shops, at home and in the office through mobile devices, to information previously available only from a personal computer that was physically connected to an appropriately provisioned network. They want news, stock quotes, maps and directions and weather reports from their cell phones; email from their personal digital assistants; up-to-date documents from their smartphones; and timely, accurate search results from all their mobile devices.

Because input capabilities may be more limited in a mobile device (e.g., a smartphone) than in a fixed computing device (e.g., a desktop computer), more effort may be required of a user to enter a search query (or other information) from the mobile device than would be required of the user in entering the same search query from the fixed computing device. In addition, because displays in various mobile devices are often smaller than displays in fixed computing devices, it may be possible only to display a relatively small amount of information at any given time on a mobile device. Finally, data connections between a mobile device and various networked resources (e.g., the Internet) may be slower than corresponding data connections between a fixed computing device and the same networked resources.

SUMMARY

This document describes systems and techniques that relate generally to providing information to an electronic device in a manner that is likely to be relevant to a user of the electronic device. In particular, some systems and techniques include receiving a query for information, predicting relevance of location to the query, and providing one or more sets of results that are responsive to the query and that are selected based on the predicted relevance of location to the query. Put another way, some systems and techniques "promote" location-based search results when location is likely to be relevant to a corresponding query, even if location information is not included in the query.

In some implementations, a computer-implemented method is disclosed. The method includes receiving a search query from a remote device, determining if the search query includes location-related information, and if the search query includes location-related information, generating a first result set based on the search query and the location-related information, and if the search query does not include location-related information, determining whether a location indicator is associated with the remote device, and if a location indicator is associated with the remote device, generating a second result set based on the search query and the location indicator. The search query can comprise a plurality of text portions, and determining if the search query includes location-related information comprises determining whether one of the plurality of text portions corresponds to a physical location identifier. The physical location can comprise at least one of a zip code, a municipality name, an area code, a congressional district, a GPS coordinate, a latitude/longitude coordinate, an airport code, or a wireless network-provided location coordinate.

In certain aspects, the search query is received from a mobile communication device. Also, determining whether a location indicator is associated with the remote device can comprise accessing an electronic record associated with the remote device and determining whether the electronic record stores a default location indicator. In addition, determining whether a location indicator is associated with the remote device can comprise determining whether current location information is available from either location-pinpointing structures in the remote device or location-pinpointing structure in a communication network from which the query from the remote device is received.

In other aspects, generating the second result set based on the search query and the location indicator includes generating a modified search query that includes the location indicator. Generating the second result can further include transmitting the modified search query to a search engine and in response, receiving from the search engine the second result set. The method may also include transmitting the first result set or the second result set to the remote device. In addition, the method can include formatting the first or second result set in a mark-up document to be displayed with a drop-down menu that includes another location, the other location corresponding to a previous search query received from the remote device or a previous information session initiated by the remote device. The method may also include receiving input from the remote device, the input selecting the other location; and generating, in response to receiving the input, a third result set based on the search query and the other location. Moreover, the method may further include generating a third result set having one or more elements that are each substantially independent of location, may also include formatting the second result set and the third result set in a mark-up document to be displayed in the remote device, and transmitting the mark-up document to the remote device, and may further include sequencing the second result set and the third result set based on a predicted relevance of location to the received search query. Sequencing the second result set and the third result set can likewise include determining whether the received search query or a substantially similar variation of the received search query is in a list of queries that have been previously determined to be likely to be incorrectly associated with location information, and if the received search query or substantially similar variation of the received search query is stored in the list of queries, formatting the third result set to be displayed before the second result set, and if the received search query or substantially similar variation thereof is not stored in the list of queries, formatting the second result set to be displayed before the third result set.

In yet other aspects, the method may further include generating a prompt to request location information from the remote device if the search query does not include location-related information and a location indicator is not associated with the remote device, and generating a third result set having one or more elements that are each substantially independent of location. In addition, the method can also include formatting the third result set and the prompt in a mark-up document to be displayed on the remote device, and transmitting the mark-up document to the remote device. Moreover, the method can include sequencing the third result set and the prompt based on a predicted relevance of location to the received search query. In addition, sequencing the third result set and the prompt can include determining whether the received search query or a substantially similar variation thereof is stored in a list of queries that have been previously determined to be likely to be associated with location information, and if the received search query or substantially similar variation thereof is stored in the list of queries, formatting the prompt to be displayed before the third result set, and if the received search query or substantially similar variation thereof is not stored in the list of queries, formatting the third result set to be displayed before the prompt. The method may further include receiving input from the remote device, the input providing location information in response to the prompt; and generating, in response to receiving the input, a fourth result set based on the search query and the location information.

In yet another implementation, a computer-implemented method is disclosed. The method comprises receiving from a remote device a search query, determining if the search query includes location information, and if the search query includes location information, generating a first result set based on the search query and the included location information, and if the search query does not include location information, identifying previously used location information associated with a previous session of the remote device, and generating a second result set based on the search query and the previously used location information. Identifying previously used location information can include accessing an electronic record associated with the remote device and identifying stored location information in the electronic record. In addition, identifying stored location information can include identifying a plurality of location values corresponding to a plurality of previous search queries or information sessions, and selecting one of the plurality of location values.

In certain aspects, the method further comprises formatting the first result set or the second result set in a mark-up document to be displayed with a drop-down menu that includes another location, the other location comprising at least one of the plurality of location values, and can also comprise receiving input from the remote device, the input selecting the other location; and generating, in response to receiving the input, a third result set based on the search query and the other location.

In another implementation, a computer-implemented system is disclosed. The system includes a request processor configured to identify location-related information associated with a search query received from a mobile device, a search engine to receive the search query from the request processor along with a location identifier for the location-related information; and to generate local search results, and a response formatter to order categories of search results received from the search engine, including local search results, according to a determined level of relevance between each category of search results and the received search query. The response formatter can promote a local result category above other result categories if a search query entered by a user includes location-related information. The response formatter may likewise promote a local result category above other result categories if the received search query is determined to be sufficiently related to location-based information. In addition, the search query can be determined to be sufficiently related to location-based information if one or more terms of the search query appear in a list of location-based terms.

In yet another implementation, a computer-implemented system is disclosed. The system comprises a request processor configured to identify location-related information associated with a search query received from a mobile device, a search engine to receive the search query from the request processor along with a location identifier for the location-related information; and to generate local search results, and means for ordering information representing categories of search results received from the search engine, including local search results, according to a determined level of relevance between each category of search results and the received search query.

The details of one or more implementations are set forth in the accompanying drawings and the description below. Other features, objects, and advantages will be apparent from the description and drawings, and from the claims.

DESCRIPTION OF DRAWINGS

FIG. 1A illustrates an exemplary user interface that can be used to organize and obtain information.

FIG. 1B. illustrates another user interface that allows a user to change current or default location information.

FIG. 2A illustrates example location-based and non-location-based results that can be provided in response to a query.

FIG. 2B illustrates example non-location-based results that can be provided in response to a query.

Like reference symbols in the various drawings indicate like elements.

DETAILED DESCRIPTION

Figure 2C:
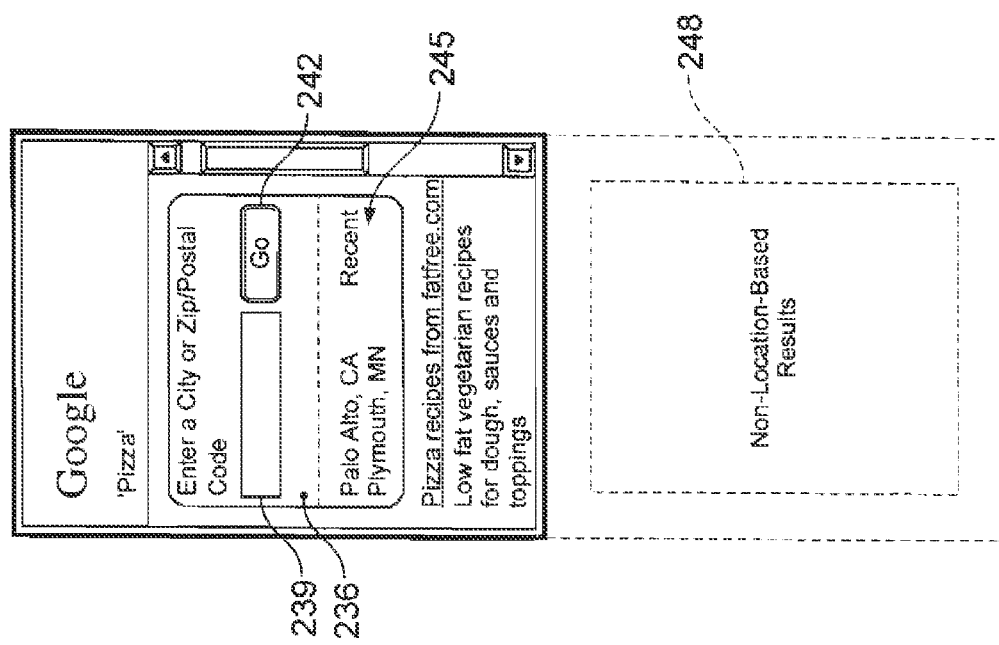
FIG. 2C illustrates an example prompt that can be provided in response to a query to request specific location information.

The systems and techniques described in this document relate generally to providing information to an electronic device in a manner that is likely to be relevant to a user of the electronic device. In particular, some systems and techniques include receiving a query for information, predicting relevance of location to the query, and providing one or more sets of results that are responsive to the query and that are selected based on the predicted relevance of location to the query. Put another way, some systems and techniques "promote" location-based search results when location is likely to be relevant to a corresponding query, even if location information is not included in the query.

Users of computing or mobile communication devices employ their devices to access various kinds of information. For example, a cell phone user may employ her cell phone to check stock prices and read news articles each day. As another example, a smartphone user may employ his smartphone to receive weather forecasts and check on nearby traffic levels. As another example, a personal digital assistant (PDA) user may periodically employ her PDA to find direction, maps and contact information for a restaurant or business, or to compare prices of a product offered by different vendors.

Information accessed by users from their various devices can be organized into categories, or "corpora," and may be available from particular information providers. For example, a news outlet, such as MSNBC, can provide news directly to user devices connected to www.msnbc.com. Some information providers offer information from multiple categories. For example, Google offers weather forecasts, news information, maps and directions, image information, and other categories of information to user devices connected to www.google.com.

Some information providers (e.g., Google) also offer search services that accept queries from user devices and provide information that is responsive to the queries. The responsive information can be drawn from one or more categories. For example, in response to a search query for "Starbucks," an information service provider may provide stock information, news information, and a map to a specific Starbucks coffee shop. As another example, in response to a search query for a famous actor or actress, an information provider may provide news information and image information about the actor or actress.

Information in some categories is associated with specific locations. For instance, in the Starbucks example above, map or direction information can be provided for a particular location. As other examples, weather information can be provided for a particular location or region, news information can be provided for a particular region, etc.

As used in this document, "location" includes, for example, physical locations (e.g., buildings, establishments, intersections, roads, geographical features or areas, municipalities, etc.), and "location-based information" includes, for example, information relating to physical locations, such as maps showing the physical locations, descriptions of a particular building, hours of operation or contact information for an establishment, history of the establishment, historical information associated with a geographical feature, etc. Location-based information can also include, for example, directions from one point (e.g., a "current" location of a user or user device) to a another physical location. The above examples are non-limiting examples, and the reader should appreciate that "location" and "location information" encompass other concepts, including, for example, concepts related to traditional "local" search results.

Relevance of location to a query can be predicted in a number of ways, as will be described in greater detail below. For example, relevance of location to a query can be predicted based on location information included in the query itself, specific words in the query that are not directly associated with the location, a profile associated with the electronic device, recent location-directed queries transmitted by the electronic device, or location coordinates corresponding to the current physical location of the electronic device.

Because a user of an electronic device may frequently access the same kinds of information (e.g., a user may check a weather forecast and certain stock prices each morning, read news over most lunch hours and check traffic congestion levels each afternoon), the electronic device (e.g., hardware and/or software associated with the electronic device) can be configured to provide the user with various kinds of information with little or no action on the part of the user. For example, the electronic device can be configured with a user interface that periodically interacts with an information provider (e.g., Google) to access preconfigured information of interest to the user, such as weather, traffic, stock or other information. The user interface can also provide the user with a way of easily accessing other information. For example, the user interface can include a search box for receiving queries from the user for various information, the user interface can provide quick access to a user's email account or accounts, the user interface can provide links to user-configurable sports information, and so on. An example user interface is shown in FIG. 1A and further described below.

FIG. 1A illustrates an exemplary user interface 100 that can be used to organize and obtain information. In particular, the user interface 100 can be loaded in or accessed from an electronic device, such as a smartphone, cell phone or wireless-enabled personal digital assistant. In some implementations, the user interface can be employed by a user of the electronic device to organize frequently accessed information and to easily obtain additional information. As shown in FIG. 1A, various modules shown as tabs 103A-103F may be shown in collapsed form with only titles showing, and may be expanded to show more information on a particular topic when they are selected by a user. The modules may form a personalized home page for a user of a remote device, and may be coordinated with a desktop homepage for the user. Each module may address and display a certain category of information for the user.

As shown, the user interface 100 includes a number of tabs 103A-103F, each of which provides a link to a different category of information. In some implementations, the different categories of information can be selected and configured by the user, and selection of each tab can cause the user interface 100 to display additional information, which can also be preconfigured. For example, in some implementations, user selection of a weather tab 103A causes the user interface to display detailed weather information corresponding to a current or default location. User selection of a traffic tab 103B can cause the user interface 100 to display traffic information corresponding to the current or default location. Depending on the capabilities of the mobile device, expansion of a tab may occur directly on the device, without the need for another round-trip to obtain additional information, or may involve making another request to a central server.

User selection of a news tab 103C can cause the user interface 100 to display news information, which may include local or regional news corresponding to the current or default location. User selection of a data services tab 103D can cause the user interface 100 to display an interface through which the user can access data services such as new ring tones, music and other data services. User selection of an email tab 103E can cause the user interface 100 to provide access to an email account, to, for example, allow the user to read, compose and send emails. User selection of a sports tab 103F can cause the user interface to display sports information. The information tabs 103A-103F shown in FIG. 1A are merely exemplary. Other implementations can include more or fewer tabs, or tabs corresponding to different categories of information.

In addition to providing different categories of information in response to user selection of the tabs 103A-103F, certain summary information can be displayed within individual tabs. For example, a graphical weather indicator 106 and temperature indicator 109 can be displayed in the weather tab 103A to provide the user with instant access to summary weather information. As another example, a new article indicator 112 in the news tab 103C, or a new message indicator 115 in the email tab 103E, can provide notification of a number of news articles or unread email messages, respectively. As another example, a score-update indicator 118 can be provided in the sports tab 103F to provide summary sports information (e.g., current or recent sports scores) that is of interest to the user.

By providing summary information, some implementations of the user interface 100 are optimized to provide a large amount of information to the user (with little or no input required from the user), while at the same time providing the user access to additional information through a selection of individual information tabs 103A-103F. In addition, the user interface 100 can include a search box 121 to facilitate receipt of a user search query to provide access to even more information (e.g., upon entering a search query in the search box 121 and activating a corresponding search initiation control 124).

As described above, the specific tabs that are displayed in the user interface 100 can be configured by the user and associated with an account corresponding to that user. Moreover, specific information accessible through each tab can be configured. For example, in some implementations, the user can configure the user interface 100 to provide sports information (e.g., through a sports module corresponding the sports information tab 103F) for specific sports (e.g., hockey) or specific sporting teams (e.g., the University of Wisconsin and the University of North Dakota). As another example, in some implementations, the user can configure an email module to provide access, through the email tab 103E, to one or more specific email accounts maintained by the user.

In some implementations, configuration information specifying the various categories of information of interest to a particular user is stored in an account or profile. In some implementations, the profile is maintained by an information provider, such as an information provider to which the electronic device connects in order to receive information. (Details of an exemplary information provider are illustrated in and described with reference to FIGS. 3 and 4). In other implementations, configuration information is maintained in the electronic device itself (e.g., in one or more cookies or configuration files stored in the electronic device). In still other implementations, the configuration information is stored in a distributed manner—i.e., partially at one or more information providers, and partially in the electronic device itself (e.g., with a cookie that stores only an identification number).

As shown in one implementation, the user interface 100 can include an indicator 127 corresponding to an account or profile that stores configuration information. The indicator can include the name of the user (e.g., "Andrew") corresponding to the account, or some other handle or reference to the account. One piece of configuration information that can be stored in a profile is a default location to be used in location-based searches. As shown, the user interface 100 can also provide an indicator 130 of the default location of the electronic device. Alternatively, the indicator 130 can display a current location, in implementations in which the current location can be determined.

In some implementations, the current location is determined by a location-pinpointing technology, such as, for example, hardware that receives and interprets global positioning system (GPS) information (or other geocode signal information), or hardware/software associated with a wireless network with which the electronic device exchanges signals to transmit and receive information (e.g., hardware/software that compares signal strength from different cell towers within a wireless network to pinpoint a location of the device. In some implementations (e.g., implementations in which the electronic device and/or wireless network lack or disable location-pinpointing technology), the indicator 130 corresponds to a default location that is associated with a user profile corresponding to the user interface 100.

In some implementations, once current location information is detected (e.g., by GPS or other location-pinpointing technology) or default location information is configured for any of the user-configurable modules, the location information is propagated to other information modules. That is, a location that is specified for a weather module can also be used by a traffic or news module. In some implementations, a user profile can be associated with multiple locations. For example, a Palo Alto, Calif., user of a smartphone with GPS functionality can configure Palo Alto, Calif. to be a default "home location" for which traffic, weather, and news information are provided to the smartphone. In some implementations, as is described in greater detail below, the default location is added to search queries that do not specify location information, for example, in order for the information provider to determine the relevance of, and subsequently provide, local search results.

In some implementations, a "current" (e.g., GPS-provided) location takes precedence over a default "home" location when the two differ. For example, when the Palo Alto user mentioned above travels to Brooklyn, N.Y., the corresponding user interface may be configured to provide, for example, weather and traffic information for Brooklyn, N.Y., rather than for Palo Alto, Calif.

In some implementations, it may be advantageous to provide a way for a user to override the current or default location. For example, the Palo Alto user who is currently in Brooklyn, N.Y., may be about to travel to a new location—take Plymouth, Minn., as an example. Accordingly, the user may be interested in weather information in Plymouth, Minn., as well as directions to a popular Plymouth, Minn., restaurant. An example interface by which a current and/or default location can be overridden is illustrated in FIG. 1B and described next.

FIG. 1B illustrates an interface 133 by which a user can change a current or default location, in order, for example, to provide a new location reference for various information modules. In some implementations, the interface 133 can be activated by selection of a change-location control 136. Upon selection of the change-location control 136, a window, such as the interface 133 that is shown in FIG. 1B, can appear. In some implementations, the interface 133 includes an input box 139 in which the user can enter a city or zip/postal code, or other information, corresponding to a new location. The interface 133 can also include a control 142 (e.g., the "go" button) that, upon selection, applies the new location to a corresponding profile. Applying the new location can include temporarily setting the new location to be the default, "home" location, or causing the new location to temporarily override any "current" (e.g., GPS-related) location. For example, in some implementations, the new location overrides a "current" or "home" location until the electronic device is powered off; in other implementations, the new location overrides a "current" or "home" location for a predetermined amount of time (e.g., 15 minutes) or until the electronic device is inactive for another predetermined period of time (e.g., 5 minutes).

Where, for example, a mobile device is incapable of generating the display of FIG. 1B, other mechanisms may be employed to change a location for a user's account or device. For example, upon selecting a control to update a location, the user's device may be directed to a different page on which the user may provide information (e.g., a zip code) identifying the new location. In such a situation, the user's device may then be returned to the display that preceded the display or displays for changing location.

As shown, the change-location interface 133 can include an indicator 145 of a current or home location, as well as indicators 148 of recent locations the electronic device has been used, recent locations that have been included in queries, or recent locations that have been specified as temporary default locations. The various locations can be selected by a user to permit easier alteration of the default location, by avoiding the need to re-enter location information.

In some implementations, any time a new location is provided through the location-change interface, that new location is added to a list of recent locations. Such a list of recent locations can be stored with other configuration information—for example, in memory included in the electronic device, or in a profile stored at an information provider accessed by the electronic device. In some implementations, the size of the list of recent locations is limited to a predetermined number of locations, such as, for example, the last five or ten locations. In some implementations, the number of recent locations maintained is set by another user configuration parameter.

FIGS. 2A, 2B, and 2C illustrate example result sets that can be provided to and displayed in an electronic device in response to queries received from the electronic device. For example, FIG. 2A illustrates an example set of results that can be provided in response to a query for "Starbucks." As shown, the query itself 201 can be provided along with the results, which can include both location-based results 204 and non-location-based results 207 (depicted as "off screen," but viewable, in some implementations, through manipulation of a scroll control element 210). As shown in one implementation, the location-based results 204 include address and telephone information for different Starbucks coffee shops; the particular Starbucks coffee shops displayed are located in a current or default location of "Brooklyn, N.Y.," as indicated in a location control box 213.

In some implementations, the location control box 213 displays the current or default location as the top element 216 of a drop-down list 219 that can be accessed through a drop-down control element 222. As depicted in one implementation, the drop-down list 219 includes other recent locations associated with the electronic device. In some implementations, a user of the electronic device can select another location from the drop-down list 219, and can cause new location-based results to be provided upon activation of a location-change command (e.g., by activation of a control such as the "go" button 225). The drop-down list 219 may also or alternatively list locations associated with a search request. For example, a search on "Disney" may indicate results associated with Orlando, Fla., and also results associated with Pasadena, Calif. (and perhaps Tokyo and Paris). One location or a small number (e.g., the ones with the highest search scores) may have their information displayed, while the locations associated with the others may be shown in a drop-down list or other such mechanism, to permit a user to easily refine the locality of their search.

Other, non-location-based results 207 can be provided in addition to the location-based results 204. In some implementations in which location-based results (e.g., location-based results 204) and non-location-based results (e.g., non-location-based results 207) are provided, the location-based results are displayed first (e.g., "promoted"). That is, some implementations are configured to "promote" location-based results anytime such results are deemed to be relevant to a query. Advantageously, such implementations can allow users of electronic devices such as smartphones (which may, for example, have limited input capabilities) to obtain highly relevant location information with a minimal amount of input. Put another way, with reference to the examples provided above, such implementations can allow a user of an electronic device in Brooklyn, N.Y., to obtain information about local Starbucks coffee shops by only entering "Starbucks"—that is, without requiring the user to enter "Starbucks in Brooklyn, N.Y.," to obtain the same information.

Where a user explicitly identifies a location identifier in their search (e.g., by including a zip code), local search results may be promoted above other results, whereas when a user does not include an explicit location identifier in their search, a system may use various mechanisms, like those discussed in more detail below, to determine the appropriate position of a group or groups of local search results relative to other search results.

To facilitate access to location-based information in response to a short location-independent query, the electronic device transmits, in some implementations, location information (e.g., GPS-related information) to a corresponding information provider along with a query. In other implementations, the corresponding information provider can independently obtain location information, for example, from a wireless network that relays the corresponding query from the electronic device to the information provider (e.g., along with the query, the wireless network may provide location information that it calculates or determines, for example, by triangulating based on specific cell phone towers at which the query is received and corresponding signal strength at each tower). In other implementations, the information provider can retrieve a profile associated with the electronic device from which the query was received, or with a user of that electronic device; in these implementations, the retrieved profile can include default location information, which the information provider can use in providing location-based results.

An information provider can determine whether location is likely to be relevant to a query in a number of ways. In some implementations, the information provider performs comparative analysis of two or more results sets generated in response to a location-independent query and a modified query that includes current or default location information. For example, once the information provider receives a location-independent search query and a current or default location, the information provider can execute two searches—one search based on the received query, and a second search based on the received query with the current or default location appended (or otherwise included). The information provider can analyze the two corresponding result sets—one of which may include location-based results because of the inclusion of the current or default location—to determine whether location is relevant to the original search query.

The determination of whether location is likely to be relevant to a query can be made in a number of ways. For example, as explained in more detail below, a score may be associated with a search query, such as by rules generated by a machine learning system trained on prior search queries. The score may provide an indicium of how related a search query (or part of a query) is to certain categories of search results, such as local search results. If a query is determined to be sufficiently highly local-related, then local results may be promoted above other categories of results. Also, a list of queries that are highly local related, and not as related to general web queries, may also be formed, and queries on the list may receive results in which local results are promoted above other results. An inverse list may also be kept (i.e., queries or query terms that are highly correlated with general web search but not very correlated with local search), and queries associated with that list may result in local results not being promoted to the top, or even in local results being demoted to the bottom (in which case, they may not be delivered at all, or perhaps only in response to an additional request for results).

As another example, in some implementations, if a first result set corresponding to a received query differs significantly from a second result set corresponding to the same received query that includes location information, location may be deemed to be relevant to the original search query. In some implementations, if the second result set includes references to one or more specific physical locations (e.g., addresses or telephone numbers (as opposed to merely websites)), location may be deemed to be relevant to the original search query.

In some implementations, the query itself can be compared to a list of queries to which location is likely to be relevant. For example, statistical analysis of certain queries received by an information provider—such as "Starbucks" or "pizza"—may reveal that these queries are generally associated with location-based results; accordingly, the information provider can, in some implementations, maintain a "whitelist" of such queries for which special processing may be performed. In particular, in such implementations, any location-based search results can be automatically promoted when the underlying query is included in a whitelist maintained by the information provider.

In some implementations, an information provider maintains a similar "blacklist" of queries that are likely to falsely trigger display or promotion of location-based results. For example, an information provider can statistically analyze received queries to identify specific queries that trigger the display or promotion of corresponding location-based results that are later determined to be not relevant to the original query. (E.g., in some implementations, the information provider can determine that certain results are not relevant by analyzing user interactions with the results after they are provided to the user's device. In particular, user selection of links to results can indicate that the results are relevant; results that are ignored by the user can be deemed to be not relevant. Over time, and by analyzing a large number of similarly queries, an information provider can, in some implementations, determine that location is or is not generally relevant to specific queries.)

Certain queries for which location is determined to be not relevant can be stored in a "blacklist." Subsequently, when result sets are analyzed to determine the relevance of location to the corresponding query, the blacklist can be used to override a determination by location relevance-determining algorithm. That is, if a location relevance-determining algorithm determines that location is relevant to a query, but the query—or a similar variation of the query—appears in a blacklist, any location-based results that are identified can be omitted, or provided but not promoted to the first display position.

FIG. 2B illustrates an example of non-location-based results that are provided in response to a query. As shown in FIG. 2B, the original query was "address of Steven Spielberg." In some implementations, inclusion of "address of" in a search query triggers location-based results. However, in this example, no location-based results may be available (e.g., because personal address information of celebrities, such as Steven Spielberg, may not be publicly available). Moreover, any location-based results that are identified may not be relevant to the user's original search query. (E.g., results that are identified may relate to web addresses of sites associated with Steven Spielberg or street addresses of general celebrity contact or fan mail filtering organizations that are not directly associated with Steven Spielberg.) Other various keywords may also be used in the promotion or demotion of local search results.

To determine that location is not likely to be relevant to a query related to Steven Spielberg, an information provider that receives the query can retrieve a blacklist. In particular, the information provider may have already determined that location-based results are not likely to be relevant to queries including "Steven Spielberg," and thus, "Steven Spielberg" may be included in a blacklist (e.g., a blacklist maintained by the information provider). Accordingly, even if location is initially determined to be relevant to a query for "address of Steven Spielberg" (e.g., based on the "address of" portion of the query) by a location relevance-determining algorithm, the blacklist can be used to override the location relevance-determining algorithm, and any location-based results that are identified can be omitted, or provided but not promoted. Rather, as shown in one implementation, other results, such as image results 231 or news results 233 can be provided.

FIG. 2C illustrates an implementation in which location is determined to be relevant to a query, but no current or default location information is available that corresponds to the electronic device from which the query was received. In this implementation, a prompt for a location of interest is provided to the user. For example, a user of a cell phone for which location-pinpointing services are not available (e.g., the cell phone lacks or has disabled location-pinpointing hardware and a corresponding wireless network cannot or does not provide location information), and who does have or has not set up a corresponding profile with a default location, may enter a query for "pizza." The information provider may have previously analyzed multiple queries for "pizza" or other similar key words and determined that location is likely to be highly relevant to the query. Accordingly, as described above, the information provider may maintain a whitelist that includes "pizza." Thus, in response to a query for "pizza," the information provider can send a message to the electronic device from which the query for "pizza" was received, in order to prompt a user of the electronic device to enter a specific location of interest for the "pizza" query.

In some implementations, the prompt for location information includes an input box 239 in which the user can enter a city or zip/postal code corresponding to a new location. The prompt can also include a control 242 (e.g., the "go" button) that, upon selection, submits the new location to the information provider. In some implementations, even though a current or default location may not be available, recent locations may still be available; if they are, they can be displayed in a recent-location list 245, as shown. In some implementations (not depicted in the figures), if recent locations are available, the most recent location is used as a temporary current or default location. In one implementation, as depicted in FIG.

2C, a prompt for a location is provide when location is deemed relevant to a query and current or default location information is not available.

In some implementations in which location is determined to be relevant to a query but no current or default location information is available, the position of a prompt for information can be determined based on the presence or absence of the corresponding query in a whitelist. For example, if a query is included in a whitelist, location may have previously been determined to be relevant to the query, and it may be advantageous to display the prompt for location information before any non-location-based results (e.g., as shown in FIG. 2C). As another example, if the query is not included in a whitelist, it may be less likely that location is relevant to the query, and it may be advantageous to display the prompt for location information after any non-location-based results. In this manner, highly relevant search results can be provided to electronic devices for display to users, in response to very short queries transmitted by the electronic devices on behalf of the users.

Figure 3:
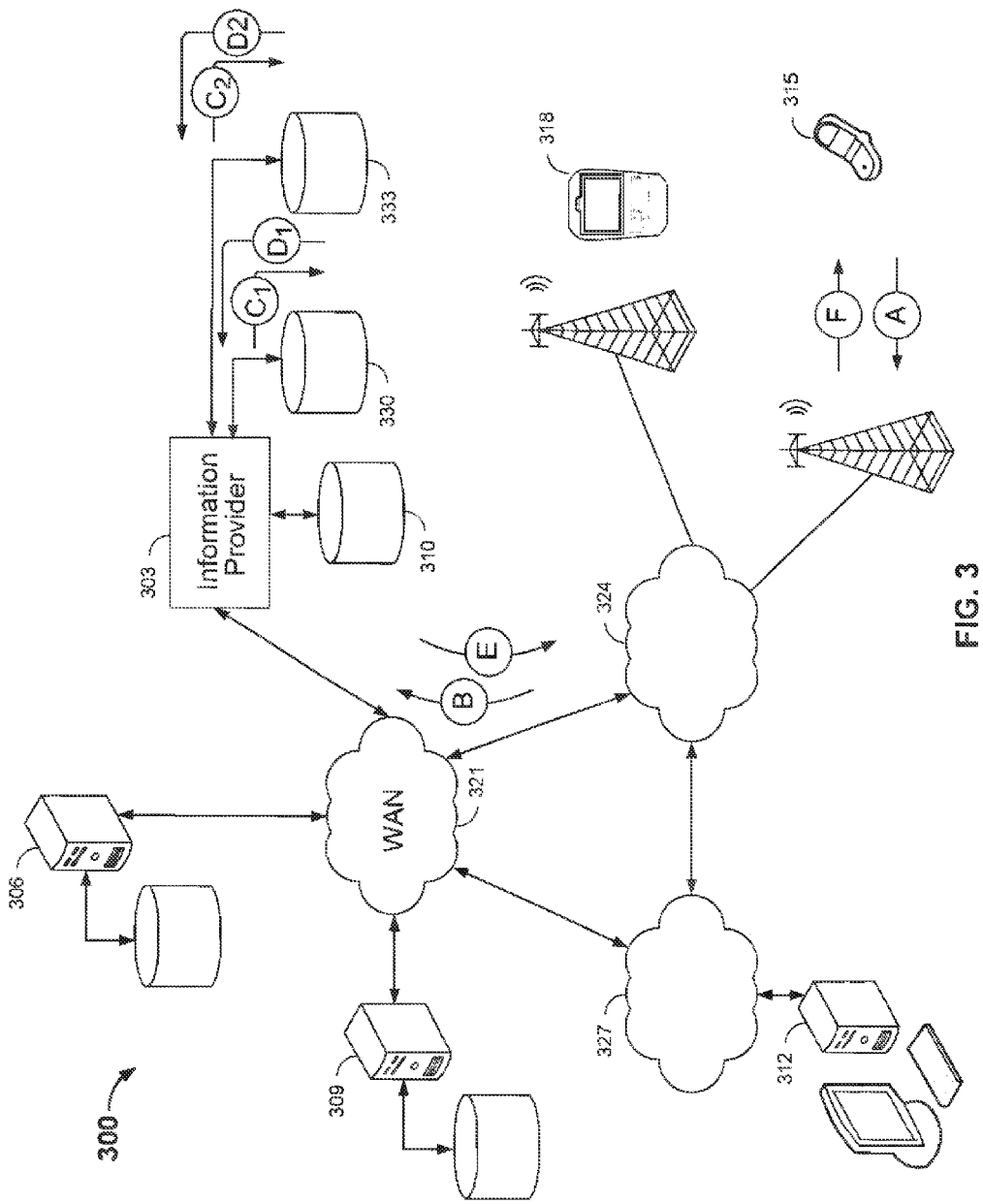
FIG. 3 is a block diagram of an example system that can receive a query, predict relevance of location to the query, and generate result set(s) that are responsive to the query, based on the predicted relevance of location to the query.

FIG. 3 is a block diagram of an example system 300 that can receive a query from a user's electronic device, predict the relevance of location to the query, and generate result set(s) that are responsive to the query, based on the predicted relevance of location to the query. For example, the system 300 can receive a query for "Starbucks" from the cell phone 315, predict that location is highly relevant to the query, and generate result sets that include, for example, information about a Starbucks coffee shop near the current location of the cell phone 315. As another example, the system 300 can receive a query for "polydicyclopentadiene," predict that location is not at all relevant to the query, and generate result sets that include, for example, scientific articles related to polymers (but not, for example, "location-based" result sets).

To receive and process queries from electronic devices, the example system 300 includes an information provider 303. In some implementations, the information provider 303 includes a search engine, (e.g., a search engine like that provided by Google) that indexes various categories of information that are either stored internal to the information provider 303 or external to the information provider 303. For example, in some implementations, location-based information can be stored in one index, such as an index 330, and non-location-based information can be stored in another index, such as an index 333. The search engine can receive a query for information, search its indexes of different categories of information, and provide a list of relevant content that is classified in one or more categories of information. The reader will appreciate that this configuration is merely exemplary. Multiple indexes can be maintained and may be distributed logically and geographically in ways other than in the example arrangement that is depicted in FIG. 3.

The list of relevant content can include a list of references to the content, rather than the content itself. Or the list of content can include actual content or previews of the actual content. For example, a list of relevant news content can include various links to news content that is stored external to the information provider 303. Each link can be associated with a preview of the actual available information, such as a headline and/or story hook, to help the user decide whether to follow a particular link and access the actual content. As another example, a list of relevant image content can include links to various image sources, along with low-resolution previews or thumbnails of available images to help a user decide whether to follow a particular link and access the actual image.

In some implementations, actual content that is indexed by the information provider 303 is stored in various content providers, such as the content providers 306 and 309. In some implementations, each content provider 306 or 309 stores content belonging to a particular category of information. For example, the content provider 306 may only store image information, while the content provider 309 may only store news information. In other implementations, various content providers each store and provide multiple categories of information. The content providers 306 and 309 are shown separately but can be operated by a single organization or by multiple organizations.

In some implementations, the information provider can employ a profile database 310 to maintain profile information associated with individual users or user devices (e.g., the cell phone 315). The profile database can be used to store configuration parameters associated with information particular users frequently access. The profile database can also be used to store default location information for use in responding to location-based queries that do not explicitly include a location parameter—as is described in further detail below.

As shown in FIG. 3, various networks couple the information provider 303, the content providers 306 and 309, and various electronic devices (e.g., a desktop computer 312, a cell phone 315, and a smartphone 318) that can access information provided by the information provider 303 or stored at the content providers 306 or 309. For example, a wide area network (WAN) 321, such as the Internet, can couple the information provider 303 and the content providers 306 and 309, and can facilitate data exchange between the various providers 303, 306 and 309. Other networks can couple various other devices to each other and to the information provider 303 or content providers 306 or 309. For example, a wireless network 324 can couple various mobile wireless devices (e.g., a cell phone 315 and a smartphone 318) to each other. In some implementations, the wireless network 324 is coupled directly to the WAN 321; in other implementations, the wireless network 324 can be coupled to the wide area network 321 through another network 327, such as the public switched telephone network (PSTN). As shown, non-mobile, or fixed, devices such as a desktop computer 312 can also access various resources of the system 300 through, for example, a connection the wide area network 321 or a connection to the PSTN 327.

An example flow of information in the system 300 is now provided. A user can enter a query for "Starbucks," for example, on her cell phone 315, directed to the information provider 303 (e.g., Google). When the user "submits" the query, her cell phone 315 can cause the query to be transmitted to the information provider 303 via the wireless network 324 and wide area network 321, over paths A and B, respectively. The information provider 303 can determine whether location-based information is likely to be relevant to the query. If the determination is made that location-based information is likely to be relevant, the information provider 303 can obtain a current or default location to add to the search query (assuming, as in the "Starbucks" example above, that no location information was included in the query itself). For example, in some implementations, the information provider 303 receives current location information from the cell phone 315 (e.g., from GPS or other location-pinpointing technology in the cell phone 315).

In other implementations, the information provider 303 can obtain location information for the cell phone 315 from the wireless network 324. As another example, the information provider can retrieve a default location from a profile that corresponds to the cell phone 315 (e.g., from a profile database 310). The information provider can obtain location-based search results using the query and the current or default information (e.g., from the index 330, via paths $C_1$ and $D_1$), and non-location-based search results using the original query (e.g., from the index 333, via paths $C_2$ and $D_2$). The location-based and non-location-based results can be ordered, formatted and provided to the cell phone 315 for display (e.g., via paths E and F).

Figure 4:
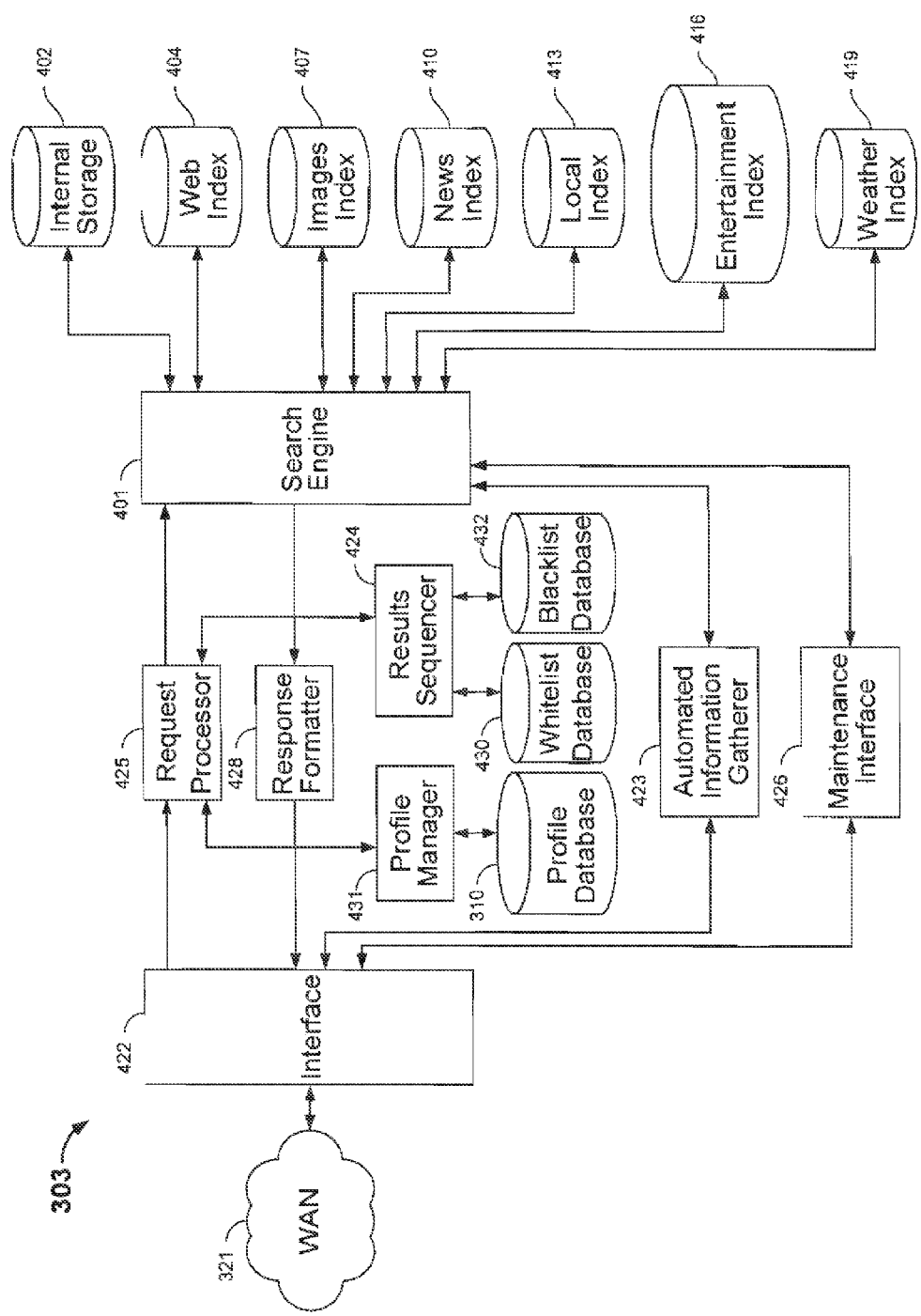
FIG. 4 is a block diagram showing additional exemplary details of the information provider that is shown in FIG. 3.

FIG. 4 is a block diagram showing additional exemplary details of the information provider 303 that is shown in FIG. 3. In one implementation, as shown, the information provider 303 employs a search engine 401 and a number of indexes for indexing or organizing different categories of information. Each index can contain data that represents information that the information provider 303 provides to users. For example, the search engine 401 can include a typical Internet search engine, and the various indexes can include links to information stored outside the information provider. The information provider 303 can provide links to users (e.g., in response to search queries), and the actual information corresponding to the links can be provided upon selection of the links by the users.

Some information referenced by entries in the various indexes can be stored within the information provider 303 (e.g., in internal storage 402). For example, the internal storage 402 can, in some implementations, "mirror" information for which search queries are regularly received, such as, for example, breaking news stories, or weather or traffic information. The internal storage 402 can also store various components needed for general operation of the information provider 303, such as, application, system parameters, and information about users who access the system.

In one implementation, as shown, the information provider 303 can maintain various indexes corresponding to different categories of information. For example, the information provider 303 can include a web index 404 for indexing web information, an images index 407 for indexing image information, a news index 410 for indexing news information, a local index 413 for indexing location-based information for various physical locations, an entertainment index 416 for indexing entertainment information, and a weather index 419 for obtaining and organizing weather information. In other implementations, the information provider 303 can maintain a single index that indexes all categories of information, including those categories depicted by the indexes 404-419. The listed categories of information are merely exemplary. Various other categories of information can be available and indexed. Moreover, the indexes themselves can be arranged differently. For example, one index may handle multiple categories of information.

The various indexes (or index) may or may not be cached. For example, the indexes 404-419 can correspond to a separate cached index database or databases (not shown) to support faster access to search results. The indexes 404-419 (or index) can be local to the information provider, or they can include an external server or storage farm (not shown). In general, each index can be distributed across many different machines and many different physical locations. For example, an index can be implemented by hundreds or thousands of storage devices in multiple data centers around the globe. The internal storage 402 can also be local or distributed.

As shown in one implementation, the information provider 303 interacts with the other devices through an interface 422. In some implementations, the interface 422 includes one or more web servers or application servers through which queries are received and from which information responsive to the queries is transmitted. The interface 422 is shown as a single interface, but the interface 422 can include various other internal interfaces through which information can be routed internal to the information provider. As an example, the interface 422 can comprise interface devices for a high-speed, high-bandwidth network such as SONET, Infiniband, Ethernet, Fast Ethernet, Gigabit Ethernet, or any suitable communication hardware operating under an appropriate protocol, such that the information provider 303 can respond to a large number of distinct requests simultaneously. The interface 422 can include network interface cards (NICS) or other communication devices and other components or interfaces common to a high-speed, high-bandwidth network. The precise design of the information provider 303 is not critical to this document and can take any suitable form.

Information in the various indexes 404-419 can be gathered by an automated information gatherer 423, such as, for example, a crawler or spider. In some implementations, the automated information gatherer 423 continuously or almost continuously obtains new information from sources connected to the WAN 321 or from other sources (not shown) connected to the information provider 303. This new information can be provided to appropriate indexes 404-419 or to the internal storage 402. In addition to being added to various indexes 404-419 or to the internal storage 402 in an automated fashion, information can be manually loaded in or retrieved from the various indexes 404-419 or from the internal storage 402 through a maintenance interface 426. In some implementations, the maintenance interface 426 can allow an administrator of the information provider 303 to manually add bulk data.

Data requests, such as search queries, can be processed by a request processor 425. The request processor 425 can, in some implementations, parse search queries or other data requests, and if necessary, reformat them to search strings or search terms that are compatible with the search engine 401. For example, in some implementations, the request processor reformats search queries received in HTML (hypertext markup language) format or text format to a format or protocol employed by the search engine 401 The request processor 425 can also refine received search queries or requests for data, for by removing articles, prepositions or other terms deemed to be "non-essential" to completing a search or data access. In addition, the request processor 425 can add location information to received search queries to obtain location-based search results.

To add location information to received search queries, the request processor can employ a profile manager 431 and the profile database 310. As described above, the profile database can store configuration information related to information that an electronic device, or user of the electronic device, frequently accesses. The profile database can also store default location information that can be retrieved (e.g., according to an identifier, or other meta information in a received query that pairs the query or device from which the query was received to a particular profile). For example, when a Palo Alto, Calif., cell phone user—who has, for example, previously stored home or default location information (e.g., "Palo Alto, Calif.") in the profile database 310—submits a query for "Starbucks," the request processor 425 can retrieve the corresponding default location information. In particular, the request processor 425 can employ the profile manager 431 and profile database 310 to retrieve a profile corresponding to the electronic device from which the "Starbucks" was received, identify default location information in the profile (e.g., "Palo Alto, Calif."), and add this default location information to the received query (e.g., to form an internal query string of "Starbucks in Palo Alto, Calif."). In this manner, information in the profile database 310 can be used to obtain relevant location-based information in response to a received, location-independent user query.

Certain information related to a device may also be stored in the device itself, such as in the form of a so-called "cookie." For example, the various pieces of location information may be stored in the cookie. Alternatively, the cookie may store an identification number that is then used as a key to access information in a database such as profile database 310. Other similar implementations may also be provided.

In one implementation, as shown, the information provider 303 includes a response formatter 428 for formatting information responsive to a search query or request for data. In some implementations, the response formatter 428 formats the information in manner that facilitates display of the information in the specific device from which the corresponding query was received (e.g., in a format such as HTML, XML (extensible markup language), WML (wireless markup language), or some other suitable format). In some implementations, the response formatter 428 also orders location-based information and non-location-based information, and determines whether to "promote" location-based information. The response formatter 428 can also generate a message requesting specific location-based information in some situations (e.g., such as the situation described above with reference to FIG. 2C, in which current or default location information is not available).

To order location-based and non-location-based information, the response formatter 428 can employ a results sequencer 429 that can determine an order of location-based and non-location-based categories of results. In some implementations, the results sequencer 429 also sequences results within each category in a manner that is likely to be helpful to a user of the electronic device to which the results are provided.

To sequence the categories of results, particularly with respect to local results, the results sequencer 429 can employ a blacklist database 432, which as described above, can store queries that may be falsely associated with location. In some implementations, an algorithm is applied by the results sequencer 429 to initially determine whether location is likely to be relevant to a particular query, in order to appropriately sequence any location-based results relative to other non-location-based results. In these implementations, the blacklist database 432 can be employed to override the initial determination. That is, if the results sequencer 429 initially determines that location is likely to be relevant to the query, but the query (or a portion or variation thereof) is included in the blacklist, the initial determination can be overridden, and non-location-based results can be provided first. On the other hand, if the results sequencer 429 initially determines that location is likely to be relevant to the query, and the query (or a portion or variation thereof) is not included in the blacklist, the initial determination can stand, and the location-based results can be "promoted," or displayed before non-location-based results.

In some implementations, location is highly likely to be relevant to a received query, but no current or default location may be available for the device or user from whom the query was received. In such implementations, it can be advantageous to prompt the user for a location of interest. Such a prompt can be disruptive to the user, however, especially for queries for which location is incorrectly determined to be relevant. To minimize unnecessary disruptions to users, the results sequencer can employ a whitelist database 430.

In some implementations, the whitelist database 430 stores queries for which location has been previously been determined to be highly relevant. The whitelist database 430 can be used to sequence any prompts for specific location that are generated and provided for display in the electronic device from which the original query was received. In particular, if the original query (or a portion or variation thereof) is stored in the whitelist, any prompt for a specific location can be "promoted" and displayed before any search results (e.g., as shown in FIG. 2C); if the original query (or portion or variation thereof) is not stored in the whitelist, any prompt for a specific location can be included before any generic location-based search results, but after other non-location-based search results. In this manner, the disruptive nature of an erroneously presented prompt for specific location information can be minimized.

In addition to, or instead of, the use of whitelists and/or blacklists, other mechanisms may be used to determine the local relevance of a particular query. For example, a supervised machine learning system may be trained using log data of past searches, associated with indications of whether the searches were local or non-local. The system may use the teaching responses to generate a scoring mechanism or set of rules for determining whether other, future searches are locally associated or not. Various mechanisms for such learning may be suitable.

Figure 5:
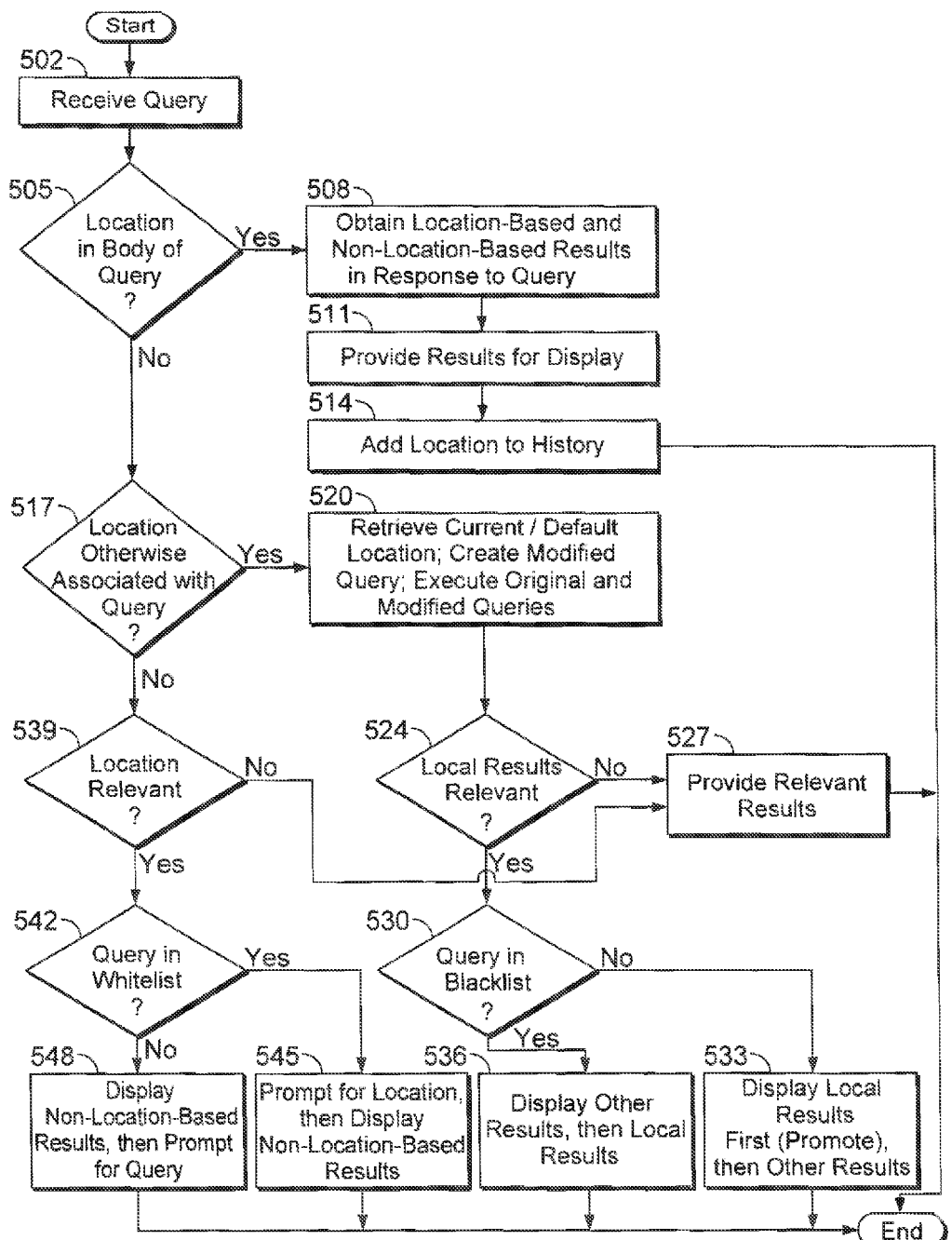
FIG. 5 is a flow diagram of an example method for receiving a query for information, predicting relevance of location to the received query, and based on the predicted relevance, providing location-based and/or non-location-based results for display.

FIG. 5 is a flow diagram of a method 500 for receiving a query for information; predicting the relevance of location to the received query; and providing to the electronic device, based on the predicted relevance, location-based and/or non-location-based results that are responsive to the query. The method 500 begins with receiving (501) the query. For example, the information provider 303 can receive a query for information from the cell phone 315.

The method 500 can include determining (505) whether location information is included in the body of the query. For example, in some implementations, the request processor 425 of the information provider 303 parses the query to identify any portion that corresponds to a physical region or location (e.g., a zip/postal code, a city or other municipality, a GPS or other "geocode" coordinate, etc.). In particular, the request processor 425 could, for example, identify "Plymouth, Minn." as location information in a query such as "Steak house in Plymouth, Minn."

If location information is included in the body of the query, then in some implementations, the method 500 includes obtaining (508) location-based results, and optionally, non-location-based results that are responsive to the query. For example, the search engine 401 can search various indexes 404-419 (e.g., particularly index 413) to obtain information that is responsive to the query. As a result of the search(es), the search engine 401 can identify one or more search results, such as, for example, a location-based search results set and a "web-based" result set (i.e., a result set containing information that is categorized as "web information"). The relevant results can be provided (511) to the electronic device from which the query was received for display.

If the location included in the query is not already in a list of recent locations stored in a profile that is associated with the electronic device from which the query was received (or associated with a user of that device), the location can be added (514) to the profile. In particular, for example, the location can be stored in the profile database 310, in a profile associated with the electronic device.

In some implementations, if location information is not included in the body of the received query, the method 500 includes determining (517) whether location information is otherwise associated with the query. For example, the method 500 can include determining (517) whether current location information is available from meta information received with the query. In particular, the information provider can determine (517) whether a GPS coordinate—or other geocode information—is received with the query, or whether location information is otherwise available from, for example, a wireless network that conveyed the query from the electronic device to the information provider. As another example, the method 500 can include determining (517) whether default location information is associated with the electronic device (or a user of the device) from which the query was received. In particular, the information provider 303 can employ the profile manager 431 to retrieve a profile associated with electronic device (e.g., the cell phone 315) to determine whether default location information is included in the profile.

If current location information is available or if default location information is included in a corresponding profile, the current or default location information can be added (520) to the received query to form (520) a modified query, and the original query and modified query can be executed (520). For example, in the case of default location information being stored in a profile, the request processor 425 can add the default location information provided by the profile manager 431 to the received query, then provide the original received query to the search engine 401 and a modified query with the default location information to the search engine 401.

The method 500 can include determining (524) whether local results are relevant to the receive query. For example, results generated in response to the first query (e.g., the original received query) can be compared to results generated in response to the second query (e.g., the query modified with default or current location information) to determine whether location is relevant to the query. In particular, in some implementations, the response formatter 428 can determine whether a number of results are indexed by the local index 413, or the response formatter 428 can determine whether there are significant differences between the results returned from the original received query and results returned from the modified query. Relevance of location-based results to a search query can be determined in other ways, as is described above.

If location-based results are determined (524) to not be relevant, other results that are determined to be relevant can be provided (527) for display in the electronic device from which the query was received. (See, for example, the results shown in FIG. 2B.)

If location-based results are (initially) determined (524) to be relevant to the query, some implementations include performing an additional check—namely, some implementations include determining whether the original query (or a portion or variation thereof) is included in a blacklist. For example, the information provider 303 can employ the results sequencer 429 to compare the received query to queries or portions or variations of queries stored in the blacklist database 432. If the query corresponds to an entry in the blacklist database 432, the query may have been previously flagged as likely to falsely trigger a correspondence to location-based results, and the initial determination (524) of location-based relevance can be overridden. That is, in some implementations, the location-based results can be provided (533) for display in the electronic device, but only after other non-location-based results (i.e., in a "non-promoted" manner, or not as the first set of results).

If the query does not correspond to any entries in a blacklist, and if location has been determined (524) to be relevant to the query, location-based results can be provided (536) for display in the electronic device in a prominent manner. In particular, the response formatter 428 can format the location-based and non-location-based results such that the location-based results are displayed first (e.g., "promoted"), followed by the non-location-based results (e.g., in a mark-up document to be provided to the electronic device).

In some implementations, a query that des not include location information within the body of the query, and that is not otherwise associated with location information (e.g., through meta information associated with the query, or through a corresponding profile) may still be subjected to additional handling. In particular, the method 500 can include determining (539) whether location is relevant to the query itself (e.g., by including an arbitrary location with the query to create a modified query as described above, or in some other manner). If it is determined (539) that location is not likely to be relevant to the query, then non-location-based results can be provided (527) for display, as in other cases described above.

On the other hand, if location is determined (539) to be relevant to the query, then a prompt for a specific location can be provided (545 or 548) for display in the electronic device. In some implementations, the method 500 includes determining (542) whether the query is included in a whitelist (e.g., possibly indicating a previously determined high likelihood of location-relevance). In particular, the response formatter 428 can employ the results sequencer 429 and whitelist database 430 to make the above-described determination (542). If the query (or a portion or similar variation thereof) is included in the whitelist, then the prompt for specific location information can be provided (545) before any results (the prompt can be "promoted," as shown in FIG. 2C). If the query (or portion or similar variation thereof) is not included in the whitelist, then the prompt for specific location information can be provided for display in the electronic device after any results (i.e., in a "non-promoted" manner).

Figure 6:
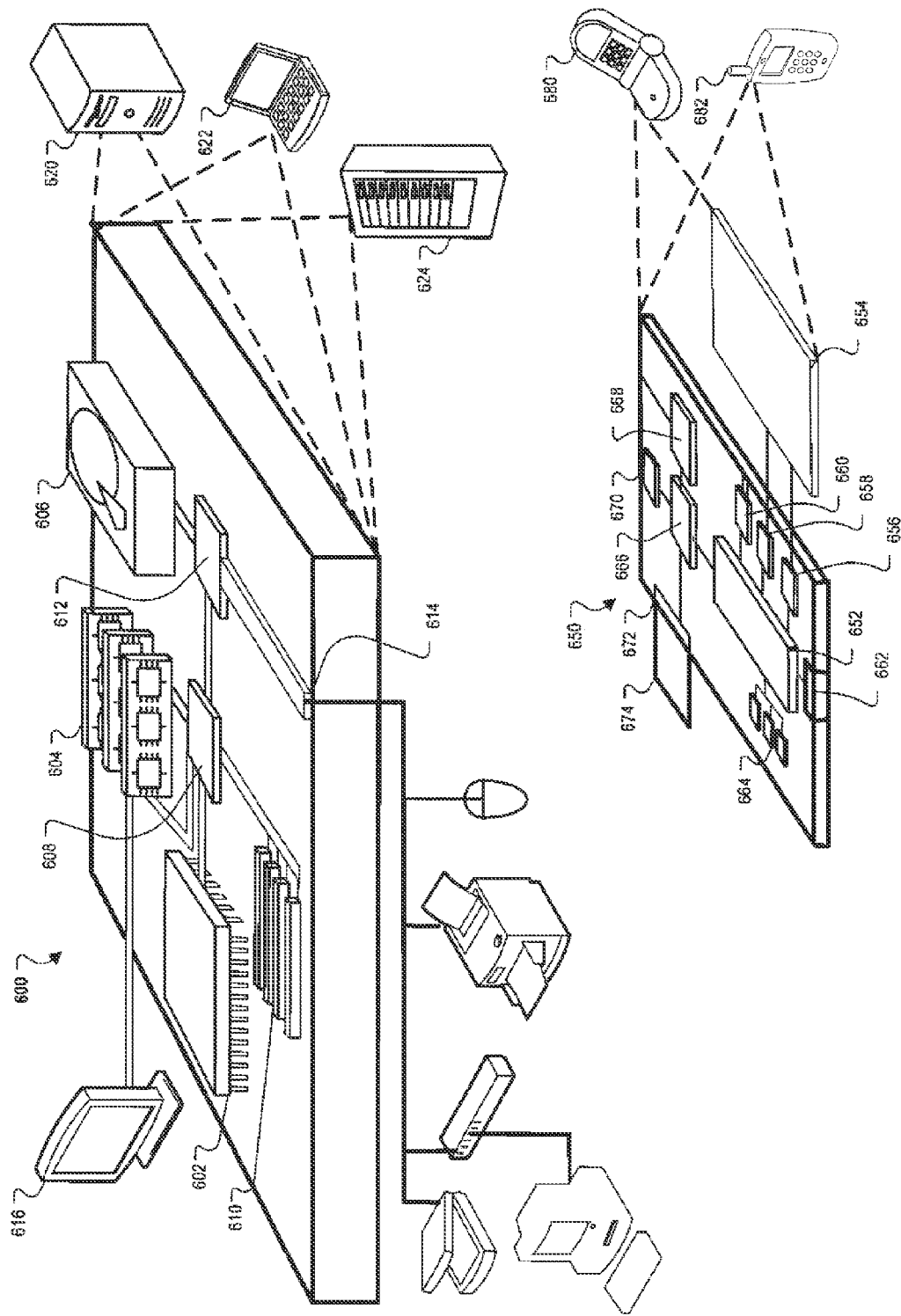
FIG. 6 is a block diagram of exemplary computing devices that can be used to implement the systems and methods described herein.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid-state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, memory on processor 602, or a propagated signal.

The high-speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other categories of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Embodiments may be implemented, at least in part, in hardware or software or in any combination thereof. Hardware may include, for example, analog, digital or mixed-signal circuitry, including discrete components, integrated circuits (ICs), or application-specific ICs (ASICs). Embodiments may also be implemented, in whole or in part, in software or firmware, which may cooperate with hardware. Processors for executing instructions may retrieve instructions from a data storage medium, such as EPROM, EEPROM, NVRAM, ROM, RAM, a CD-ROM, a HDD, and the like. Computer program products may include storage media that contain program instructions for implementing embodiments described herein.

A number of implementations have been described. Nevertheless, it will be understood that various modifications may be made without departing from the spirit and scope of this disclosure. For example, a number of systems and techniques have been described in the context of wireless, mobile devices; however, the systems and techniques could be similarly applied to wired, "less mobile" devices, in order, for example, to improve an overall user experience. Example systems have been illustrated and described, but unless specifically indicated otherwise, the systems can be arranged differently—for example, with more or fewer or different components, or with a different arrangement of the components. Moreover, example methods and techniques have been illustrated and described, but unless specifically indicated otherwise, other methods and techniques are contemplated that can include more or fewer actions, or actions that are performed in a different order or by different devices than are described. Accordingly, other implementations are within the scope of the claims.

What is claimed is:

1. A computer-implemented system comprising:
a request processor configured to receive a search query from a user device and to identify location-related information that is associated with at least one of the user device and the search query;
a search engine to receive requests from the request processor to generate a location-based set of search results and a non-location-based set of search results, and in response, to generate:
the location-based set of search results using the search query and the location-related information, and
the non-location-based set of search results using the search query to the exclusion of the location-related information;
a repository of queries that have been previously determined to be likely to be incorrectly associated with location information; and
a results sequencer to determine a results sets order that specifies an order that the location-based set of search results and the non-location-based set of search results are to be displayed relative to each other at the user device;
wherein the results sequencer is configured:
(i) to determine, based on the search query, whether a submitter of the search query is likely more interested in the location-based set of search results or the non-location-based set of search results,
(ii) to determine, responsive to a determination that the submitter of the search query is likely more interested in the location-based set of search results than the non-location-based set of search results, whether the search query or a substantially similar variation of the search query is included in the repository of queries that have been previously determined to be likely to be incorrectly associated with location information,
(iii) to generate, responsive to a determination that the search query or a substantially similar variation of the search query is included in the repository of queries, the results sets order so that the non-location-based set of search results is to be displayed in preference to the location-based set of search results, and (iv) to generate, responsive to a determination that the search query or a substantially similar variation of the search query is not included in the repository of queries, the results sets order so that the location-based set of search results is to be displayed in preference to the non-location-based set of search results.

2. The system of claim 1, wherein the results sequencer is configured to promote, regardless of whether the search query or a substantially similar variation of the search query is included in the repository of queries, the location-based set of search results for display above the non-location-based set of search results in response to a determination that user-entered content of the search query includes location-related information.

3. A computer-implemented method comprising:
  receiving, by a search system, a search query from a user device remote from the search system;
  determining a location that is associated with at least one of the search query and the user device;
  generating, by the search system and based on the search query and the location, a first results set;
  generating, by the search system and based on the search query, a second results set that is substantially independent of location;
  making a first determination that a submitter of the search query is likely more interested in the first results set than the second results set;
  determining that the search query or a substantially similar variation of the search query is in a set of queries that have been previously determined to be likely to be incorrectly associated with location information;
  in response to determining that the search query or a substantially similar variation of the search query is in the set of queries that have been previously determined to be likely to be incorrectly associated with location information:
    determining that the first determination is likely incorrect and that the submitter of the search query is likely more interested in the second results set than the first results set; and
    generating a results sets order that specifies that the second results set is to be displayed before the first results set at the user device; and
  transmitting, from the search system to the user device, data representing the first results set, the second results set, and the results sets order.

4. The computer-implemented method of claim 3, wherein determining the location that is associated with at least one of the search query and the user device comprises accessing electronic records associated with the user device and determining that the electronic records store default location indicators.

5. The computer-implemented method of claim 3, wherein determining the location that is associated with at least one of the search query and the user device comprises determining that current location information is available from either location-pinpointing structures in the user device or location pinpointing structures in a communications network from which the query from the user device is received.

6. The computer-implemented method of claim 3, wherein generating the first results set comprises generating one or more modified search queries based at least on content of the received search query and the location, wherein the location is determined to be is associated with the user device.

7. The computer-implemented method of claim 6, wherein generating the first results set further comprises transmitting the one or more modified search queries to a search engine and, in response, receiving from the search engine the first results set.

8. The computer-implemented method of claim 3, further comprising formatting, using the search system, the first results set or the second results set in mark-up documents to be displayed with respective representations of one or more other locations, the other locations corresponding to one or more previous search queries received from the user device or a previous information session initiated by the user device, wherein the mark-up documents allow the user to select one of the representations of the other locations to execute a second search based at least on the search query and a location selected by the user.

9. The computer-implemented method of claim 8, further comprising:
  receiving, by the search system, data that identifies the location selected by the user; and
  generating, by the search system in response to receiving the data that identifies the location selected by the user, a third results set based on the search query and the location selected by the user.

10. The computer-implemented method of claim 3, wherein:
  the method further comprises formatting the first results set and the second results set in a mark-up document to be displayed at the user device, the second results set being formatted for display before the first results set according to the results sets order; and
  transmitting the information comprises transmitting the mark-up document to the user device.

11. The computer-implemented method of claim 3, further comprising triggering, using the search system, the user device to generate prompts that request location information from the user device in response to (i) determining that the search query does not include location-related information, and (ii) determining that a location associated with the user device is not available.

12. The computer-implemented method of claim 3, further comprising identifying that the search query was entered at a personally configured homepage of a user of the device, wherein the personally configured homepage includes one or more information modules, particular ones of the information modules displaying respective representations of at least one category of location-based information other than the first or second results sets.

13. The computer-implemented method of claim 12, wherein the one or more information modules generate the at least one category of location-based information for display based on a current location of the user device, a default location, a location previously selected by the user, or a combination of one or more of them.

14. The computer-implemented method of claim 12, wherein the location associated with the user device is identified from a location associated with the one or more information modules and the personally configured homepage of the user.

15. A system comprising:
  one or more computers programmed to perform operations comprising:
    receiving, by the one or more computers, a search query from a user device remote from the one or more computers;

determining a location that is associated with at least one of the search query and the user device;

providing the search query and the location to a search engine and obtaining in response a first results set;

providing the search query to the search engine and obtaining in response a second results set that is substantially independent of location;

making a first determination that a submitter of the search query is likely more interested in the first results set than the second results set;

determining that the search query or a substantially similar variation of the search query is in a set of queries that have been previously determined to be likely to be incorrectly associated with location information;

in response to determining that the search query or a substantially similar variation of the search query is in the set of queries that have been previously determined to be likely to be incorrectly associated with location information:

determining that the first determination is likely incorrect and that the submitter of the search query is likely more interested in the second results set than the first results set; and generating a results sets order that specifies that the second results set is to be displayed before the first results set at the user device; and transmitting, to the user device, data representing the first results set, the second results set, and the results sets order.

16. The system of claim 15, wherein determining the location that is associated with at least one of the search query and the user device comprises accessing electronic records associated with the user device and determining that the electronic records store default location indicators.

17. The system of claim 15, wherein determining the location that is associated with at least one of the search query and the user device comprises determining that current location information is available from either location-pinpointing structures in the user device or location-pinpointing structures in a communication network from which the query from the user device is received.

18. The system of claim 15, wherein the one or more computers comprise the search engine, and wherein the operations further comprise generating, by the search engine, the first results set and the second results set.

19. The system of claim 18, wherein generating the first results set comprises generating one or more modified search queries based at least on content of the received search query and the location that is associated with at least one of the search query and the user device, and executing respective searches using the one or more modified search queries.

20. The system of claim 15, wherein the operations further comprise:

formatting the first results set or the second results set in mark-up documents to be displayed with respective representations of one or more other locations, the other locations corresponding to one or more previous search queries received from the user device or a previous information session initiated by the user device, wherein the mark-up documents allow the user to select one of the representations of the other locations to execute a second search based at least on the search query and a location selected by the user.

\* \* \* \* \*